Patented Oct. 3, 1944

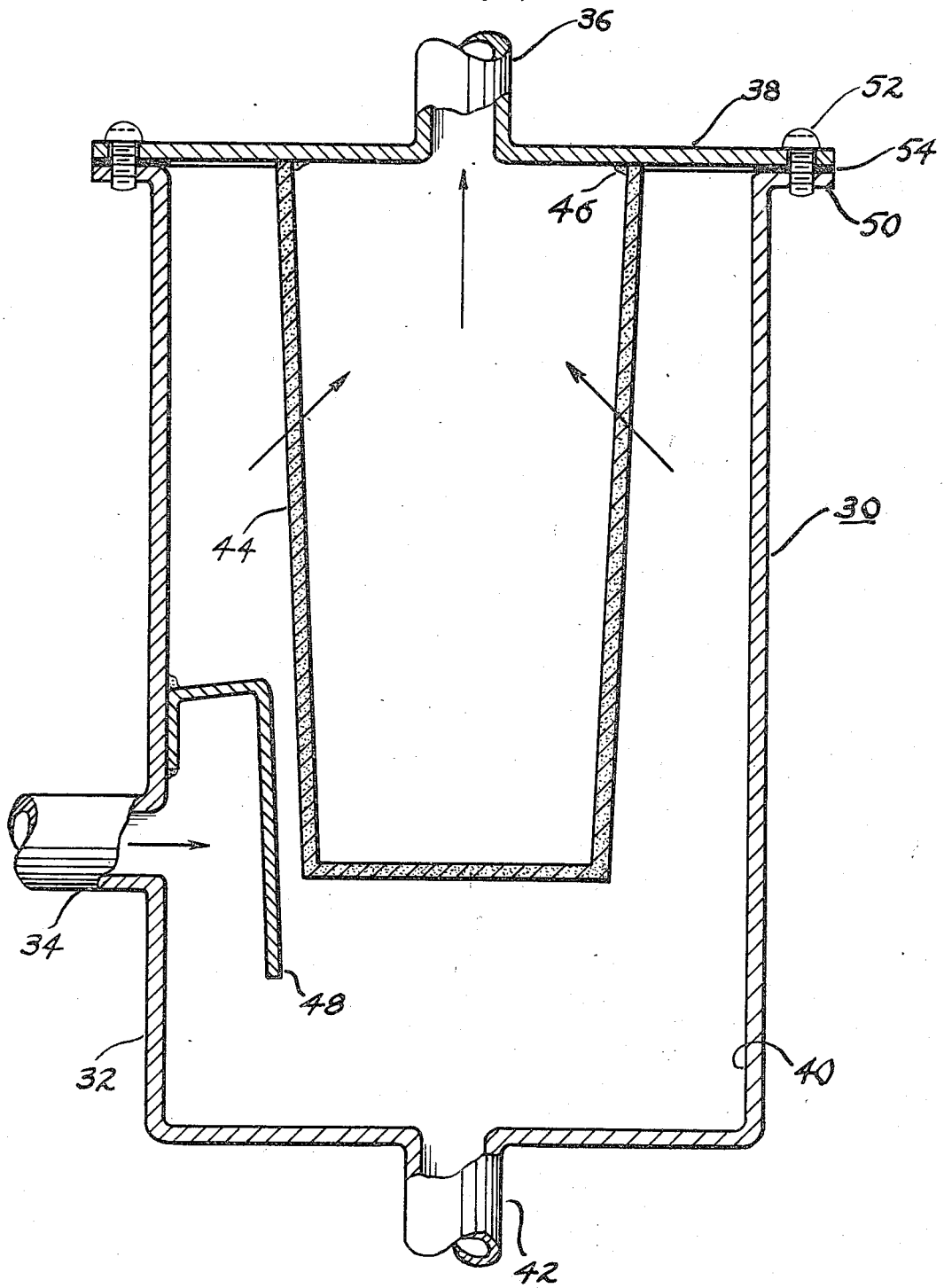

2,359,386

UNITED STATES PATENT OFFICE 2,359,386

FLUID SEPARATOR APPARATUS

Earl W. Reinsch, Dayton, Ohio, assignor to General Motors Corporation, Detroit, Mich., a corporation of Delaware Application July 9, 1942, Serial No. 450,249

1 Claim. (Cl. 210—112)

This invention relates to fluid separating apparatus, and is particularly concerned with an apparatus for separating two immiscible liquids.

An object of the invention is to provide an apparatus for economically separating gasoline and water.

Another object of the invention is to provide an apparatus for separating gasoline and water or any other two immiscible liquids wherein the separation may be accomplished continuously by interposing the apparatus in a supply line.

A further object of the invention is to provide a separating apparatus of two immiscible liquids wherein the separating medium is substantially indestructible and is formed from sintered, non-compacted metal powders.

A still further object is to provide an apparatus that will separate suspended liquids from a gaseous stream.

Further objects and advantages of the present invention will be apparent from the following description, reference being had to the accompanying drawing wherein preferred embodiments of the present invention are clearly shown.

The drawing is an enlarged view in section of one type of filtering apparatus such as may be used in connection with a gasoline supply line of an internal combustion engine.

In internal combustion engines, and, in fact in any type of thermal engine which connsumes liquid fuel, the supply of fuel is an important factor to satisfactory operation of the engine. It is desirable that the fuel for operation of the engine be supplied thereto free from extraneous liquids. This is particularly true of internal combustion engines operating on liquid hydrocarbon fuels, such as gasoline, crude oil and the like. These fuels are difficult to obtain without small quantities of water being incorporated therewith. This water is often present due to dispensing methods wherein the gasoline, or oil being immiscible in water is forced from supply tanks by pumping water therein whereby the fuel oil being lighter than water is maintained in a substantially distinct layer thereover and is forced from the tank by the influx of the water. Also in supply tanks, where other pumping means are provided, condensed water from the atmosphere is present and in smaller supply tanks for engines, this condensed water is also present. These small quantities of water cause considerable difficulty in cold weather since slugs of water sometimes lodge in the supply line to the engine carburetor and freeze, thereby closing the line. Also in warmer weather slugs of water pass through the line into the engine carburetor causing missing, etc.

I have found that by using a porous metal membrane interposed in the supply line that a remarkably accurate separation of fuel and water may be accomplished and since such porous metal membrane is made from substantially non-destructible material the filtering system will operate under any and all conditions with complete reliability. Such porous metal membranes have only been available for a short period of time and may be made by methods disclosed in the Davis Patent No. 2,157,596 or the Olt Patent No. 2,273,589 both of which are assigned to the assignee of the present invention. Membranes or filters of this character made from sintered, non-compacted metal powders are both strong and highly porous and the porosity may be controlled to any desired degree in accordance with the teachings of the aforementioned patents.

The drawing depicts one type of fluid separating apparatus 30 made in accordance with my invention which includes a cylindrical container 32 having an inlet 34 on one of the vertical walls thereof and an outlet 36 spaced therefrom in a removable cover 38. The apparatus 30 is preferably placed in the position shown when interposed in the supply line of a thermal engine since in this position a sump portion 40 will function so that liquids separated from the supply may be drained off through a drain 42 which includes a valve therein, not shown. It is also preferable to have a liquid level gauge, not shown, within the sump 40 if the valve is to be operated manually so that the liquid separated from the main supply may be drained off periodically. Appended to the cover plate 38 is a porous metal cup 44 which is made from sintered, non-compacted metal powder. The cup 44 may be attached to the plate 38 in any suitable manner such as by brazing at 46. The cup 44 encloses the outlet 46 and extends downwardly toward the inlet 34. In order to prevent direct impingement thereon by the incoming liquid a baffle plate 48 is interposed between the inlet and the cup, which baffle plate is welded or otherwise attached to the cylinder 32. Cylinder 32 also includes an outwardly turned flange 50 at the upper end thereof which is threaded to receive a plurality of bolts 52 that clamp the cover plate 38 thereto. A gasket 54 is provided which is interposed between the flange 50 and the plate 38 to insure a fluid-tight joint.

In operation, the porous metal cup 44 becomes wetted with gasoline and will permit only gasoline to pass therethrough and therefore in normal operation in a fuel line it is only necessary to cause a flow of fuel through the filter in order to wet the cup since the quantity of water in commercial gasoline is quite small. Thus when any droplet of water passes through the line and comes in contact with the cup 44 it is repelled and due to gravity settles into the sump 40. The baffle 48 by preventing direct impingement of the incoming supply prevents passage of droplets of water through the porous metal membrane through the velocity of the supply. The sump should be drained before the water level reaches the bottom of the cup 44 to insure complete separation.

If the filter is to be used or other types of separation where appreciable quantities of both immiscible liquids are present, wetting of the membrane by either liquid will prevent passage of other liquid therethrough. Thus in filtering operations where crude oil, including an appreciable quantity of water, is to be separated it will be possible to prevent the water from coming through by wetting the cup 44 with oil or vice versa. Similarly, other liquids which are substantially immiscible with on another may be separated, for example, carbon disulphide and water, chloriform and water, benzine and water etc.; all of these substances are but slightly miscible and therefore a satisfactory commercial separation may be effected by the use of the filtering apparatus described. Likewise, other well known immiscible combinations may be separated as well as vapors such as water in air such as mist etc.

The particular shape of the apparatus as shown in the drawing is preferred since a large surface of porous metal is present when using the membrane in cup form. However, in small volume separations a flat plate may be utilized. It is apparent that when a flat plate is used and the plate is merely interposed within a tube, the filtering operation can not be continuous since there must be some type of sump in continuous filtering operations to permit periodical removal of the liquid separated out. However, in batch type separations a flat plate may be used with satisfactory results if the volume of liquid to be separated is not great. Obviously separations of this character are best determined by trial and if the separation is not complete a second separation may be effected.

While the embodiments of the present invention as herein disclosed, constitute preferred forms, it is to be understood that other forms might be adopted, all coming within the scope of the claim which follows.

What is claimed is as follows:

A gasoline filter for use in connection with internal combustion engines and the like and adapted to be placed in the gasoline supply line between the gasoline supply and the engine for removing traces of water from the gasoline, comprising in combination; a cylindrical closed container adapted to be set in a vertical position; an inlet to said container in one of the vertical walls thereof; an outlet to said container positioned in the top wall thereof; a filter element in the shape of a cup made of highly porous, sintered, non-compacted metal powder attached to the top of said container and surrounding said outlet, said cup being so dimensioned as to only partially fill said container and terminate a substantial distance from the bottom thereof; a baffle plate attached to the vertical wall of said container and interposed between said cup and said inlet for preventing direct impingement of the incoming stream of gasoline from said cup, said baffle plate permitting flow therearound in all directions and terminating a substantial distance above the bottom of the container; a sump comprising the lower portion of said container below the cup, inlet and baffle plate, and a drain positioned in the bottom wall of said cylindrical container for draining water periodically from said sump, said porous metal cup upon once being wetted with gasoline being impervious to water, thereby preventing any passage thereof into the internal combustion engine.

EARL W. REINSCH.